US012730642B2

(12) United States Patent
Kim

(10) Patent No.: US 12,730,642 B2
(45) Date of Patent: Sep. 8, 2026

(54) ELECTRONIC APPARATUS AND METHOD OF PROVIDING PRE-UNLOCK TO USER

(71) Applicant: Seungman Kim, McLean, VA (US)

(72) Inventor: Seungman Kim, McLean, VA (US)

( * ) Notice: Subject to any disclaimer, the term of this patent is extended or adjusted under 35 U.S.C. 154(b) by 14 days.

(21) Appl. No.: 19/037,164

(22) Filed: Jan. 25, 2025

(65) Prior Publication Data

US 2026/0219889 A1 Jul. 30, 2026

(51) Int. Cl.
*G06F 9/30* (2018.01)
*G06F 3/0482* (2013.01)
*G06F 21/32* (2013.01)

(52) U.S. Cl.
CPC ........ *G06F 9/30189* (2013.01); *G06F 3/0482* (2013.01); *G06F 21/32* (2013.01)

(58) Field of Classification Search
None
See application file for complete search history.

(56) References Cited

U.S. PATENT DOCUMENTS 5,731,801 A 3/1998 Fukuzaki
7,400,878 B2 7/2008 Hassan et al.
8,233,789 B2 7/2012 Brunner
8,245,143 B2 8/2012 Yach et al.
8,276,085 B2 9/2012 Sherwani
8,279,184 B2 10/2012 Lowles et al.
8,280,363 B2 10/2012 Yoo
8,284,179 B2 10/2012 Bernstein
8,284,211 B2 10/2012 Darsu et al.
8,302,033 B2 10/2012 Matas et al.
8,358,321 B1 1/2013 Weidner
8,600,056 B2 12/2013 Heurtaux et al.
8,600,060 B2 12/2013 Priestley et al.
8,600,120 B2 12/2013 Gonion et al.
8,613,070 B1 12/2013 Borzycki et al.
8,626,125 B2 1/2014 Lee
8,627,433 B2 1/2014 Conner et al.
8,627,438 B1 1/2014 Bhimanaik
8,646,069 B2 2/2014 Kim et al.
8,649,759 B2 2/2014 Scott et al.
8,665,238 B1 3/2014 Gossweiler et al.
8,751,065 B1 6/2014 Kato
8,826,178 B1 9/2014 Zhang
(Continued)

FOREIGN PATENT DOCUMENTS

EP 2364004 A1 9/2011
KR 1020110049368 5/2011
(Continued)

OTHER PUBLICATIONS https://manuals.info.apple.com/MANUALS/1000/MA1658/en_US/iphone_ios6_user_guide.pdf.
(Continued)

*Primary Examiner* — Scott C Sun
(74) *Attorney, Agent, or Firm* — Seungman Kim; EIPG

(57) ABSTRACT

A mobile device includes a network unit to communicate with an external device, a sensor to sense an event of the mobile device, a panel to display a menu and to receive a user input, and a control unit to perform a pre-unlock process to pre-unlock the mobile device to a pre-unlock mode from a power saving mode, and to perform an unlock process to unlock the mobile device to a normal mode from the pre-unlock mode.

20 Claims, 3 Drawing Sheets

(56) References Cited

U.S. PATENT DOCUMENTS 8,994,499 B2 3/2015 Zhao et al.
9,076,029 B2 7/2015 Free
9,230,158 B1 1/2016 Ramaswamy
2003/0073448 A1 4/2003 Ozeki et al.
2004/0203895 A1 10/2004 Balasuriya
2005/0073388 A1 4/2005 Lee et al.
2006/0128305 A1 6/2006 Delalat
2006/0242434 A1 10/2006 Lee
2007/0197261 A1 8/2007 Humbel
2007/0271512 A1 11/2007 Knight et al.
2007/0277230 A1 11/2007 Hawkins et al.
2008/0070503 A1 3/2008 Bang
2008/0262839 A1 10/2008 Nonaka et al.
2008/0307360 A1 12/2008 Chaudhri
2009/0011796 A1 1/2009 Ormson
2009/0160792 A1 6/2009 Morohoshi et al.
2009/0267912 A1 10/2009 Wada
2009/0271704 A1 10/2009 Cohen
2010/0008031 A1 1/2010 Reifman et al.
2010/0313050 A1 12/2010 Harrat et al.
2011/0070864 A1 3/2011 Karam
2011/0098087 A1 4/2011 Tseng
2011/0151934 A1 6/2011 Geng
2011/0161869 A1 6/2011 Yoo
2011/0212706 A1 9/2011 Uusilehto
2012/0009896 A1 1/2012 Bandyopadhyay et al.
2012/0032979 A1 2/2012 Blow et al.
2012/0081392 A1 4/2012 Arthur
2012/0159139 A1 6/2012 Kim et al.
2012/0162261 A1 6/2012 Kim et al.
2012/0174021 A1 7/2012 Dharawat
2012/0174237 A1 7/2012 Krzyzanowsk
2012/0179994 A1 7/2012 Knowlton
2012/0235790 A1 9/2012 Zhao et al.
2012/0251993 A1 10/2012 Chidambaran
2012/0297339 A1 11/2012 Ito
2013/0015946 A1 1/2013 Lau et al.
2013/0050120 A1 2/2013 Takahashi et al.
2013/0063611 A1 3/2013 Papakipos et al.
2013/0067566 A1 3/2013 Oh
2013/0076655 A1 3/2013 Sipal et al.
2013/0151963 A1 6/2013 Costenaro et al.
2013/0202161 A1 8/2013 Shor et al.
2013/0215060 A1 8/2013 Nakamura et al.
2013/0219345 A1 8/2013 Saukko et al.
2013/0219454 A1 8/2013 Hewinson
2013/0297675 A1 11/2013 Li
2013/0298024 A1 11/2013 Rhee et al.
2014/0022285 A1 1/2014 Stovicek et al.
2014/0028823 A1 1/2014 Tahk et al.
2014/0059365 A1 2/2014 Heo et al.
2014/0059673 A1 2/2014 Azar et al.
2014/0085460 A1 3/2014 Park et al.
2014/0118520 A1 5/2014 Slaby et al.
2014/0155031 A1 6/2014 Lee
2014/0187200 A1 7/2014 Reitter et al.
2014/0203073 A1 7/2014 Braun
2014/0237378 A1 8/2014 Gonen
2014/0282877 A1 9/2014 Mahaffey et al.
2014/0283135 A1 9/2014 Shepherd et al.
2014/0289843 A1 9/2014 Chiang
2014/0330569 A1 11/2014 Kolavennu et al.
2014/0364085 A1 12/2014 Garcia
2014/0366164 A1 12/2014 Hoefgen et al.
2015/0051913 A1 2/2015 Choi
2015/0147065 A1 5/2015 Civelli et al.
2015/0218872 A1 8/2015 Breed
2015/0223891 A1 8/2015 Miller et al.
2015/0358088 A1 12/2015 Eim et al.
2016/0109954 A1 4/2016 Harris et al.
2016/0142407 A1 5/2016 Chun et al.
2016/0155426 A1 6/2016 Grunn et al.
2016/0302068 A1* 10/2016 Choi ...................... G06F 3/016
2017/0076077 A1 3/2017 Zhao
2019/0020801 A1 1/2019 Shultz
2019/0174419 A1 6/2019 Schllings
2022/0078276 A1* 3/2022 Kim .................. H04M 1/72448

FOREIGN PATENT DOCUMENTS

KR 1020120038777 4/2012
KR 10-2061913 1/2020
WO 2004070591 A1 8/2004
WO 2006090899 A1 8/2006
WO 2012049942 4/2012
WO 2012093784 A2 7/2012

OTHER PUBLICATIONS https://www.youtube.com/watch?v=VQKMoT-6XSg.
https://www.youtube.com/watch?v=yRvOlkSELNI&t=183s.
https://www.youtube.com/watch?v=xnLxKZK0fYU&t=707s.
https://www.youtube.com/watch?v=vOQXtR-mJKk&t=310s.
https://www.youtube.com/watch?v=nWdP0BJ8Wxg&t=13s.
https://web.archive.org/web/20140214075541/https://www.gsmarena.com/motorola_moto_x-5601.php.
https://www.gottabemobile.com/15-hidden-moto-x-features.
https://web.archive.org/web/20140210190047/http://www.talkandroid.com/reviews/phone/moto-xreview-finally-a-smartphone-with-features-that-matter/.
https://bgr.com/general/motorola-moto-x-review/.
https://www.middletownpress.com/news/article/Motorola-Moto-X-less-hello-Moto-more-hello-11784000.php.
https://web.archive.org/web/20140122063707/https://phandroid.com/2013/08/23/motorola-moto-xreview-video/.
https://www.cnet.com/tech/mobile/going-hands-free-with-the-moto-x-and-new-droidsmartphones.
https://www.pocket-lint.com/phones/news/motorola/123110-hands-on-motorola-skip-formoto-x-review/amp/.
https://www.talkandroid.com/guides/beginner/how-to-automatically-disable-androidssecurity-lock-screen-when-connected-to-your-home-wi-fi-bluetooth-device-or-by-location/; https://web.archive.org/web/20140201074414/https://www.gsmarena.com/samsung_i9295_galaxy_s4_active-5446.php.
https://www.youtube.com/watch?v =_ FtNWYql2WY.
https://web.archive.org/web/20140201074414/https://www.gsmarena.com/samsung_i9295_galaxy_s4_active-5446.php.
https://web.archive.org/web/20140323194552/http://www.techradar.com/reviews/phones/mobilephones/samsung-galaxy-s4-active-1160411/review/6#articleContent.
https://web.archive.org/web/20131223144050/https://play.google.com/store/apps/details?id=de.j4velin.delayedlock2&hl=en.
https://www.talkandroid.com/guides/beginner/how-to-automatically-disable-androids-security-lockscreen-when-connected-to-your-home-wi-fi-bluetooth-device-or-by-location/.
https://web.archive.org/web/20131108183642/http://www.techradar.com/reviews/phones/mobilephones/samsung-galaxy-s4-active-1160411/review/2#articleContent.
https://web.archive.org/web/20131109210925/http://www.techradar.com/reviews/phones/mobilephones/samsung-galaxy-s4-active-1160411/review/9#articleContent.
https://web.archive.org/web/20131031235157/http://www.techradar.com/reviews/phones/mobilephones/samsung-galaxy-s4-active-1160411/review#articleContent.
https://www.youtube.com/watch?v=GWEyoS9JIXE.
https://www.youtube.com/watch?v=urA48TfGuKo.
https://www.youtube.com/watch?v=5j8aDmBvej8.
https://web.archive.org/web/20140201011449/https://www.gsmarena.com/samsung_galaxy_note_3-5665.php.
https://web.archive.org/web/20140221002031/http://www.anandtech.com/show/7376/samsunggalaxy-note-3-review/5.
https://www.youtube.com/watch?v=nl9n3xlEnJA.
https://web.archive.org/web/20140211200821/http://www.anandtech.com/show/7376/samsunggalaxy-note-3-review/7.
https://web.archive.org/web/20140110163135/https:/play.google.com/store/apps/details?id=com.benhirashima.skiplock.

(56) References Cited

OTHER PUBLICATIONS https://web.archive.org/web/20140209033258/http://www.cultofandroid.com/49082/app-weekskiplock-app-installed-every-android-device-review/.
https://web.archive.org/web/20140101000954/http://benhirashima.com/posts/the-rebirth-of-unlockwith-wifi/.
https://web.archive.org/web/20140102024635/http://benhirashima.com/skiplock/faq.
https://web.archive.org/web/20070116051415/https://www.gsmarena.com/apple_iphone-1827.php.
https://www.youtube.com/watch?v=r7fVWjgxRwk.
https://web.archive.org/web/20230111060843/https://www.gsmarena.com/apple_iphone_3g-2424.php.
https://manuals.info.apple.com/MANUALS/1000/MA1539/en_US/iPhone_iOS4_User_Guide.pdf.
https://manuals.info.apple.com/MANUALS/1000/MA1622/en_US/iphone_iOS5_user_guide.pdf.
https://www.techradar.com/reviews/phones/mobile-phones/google-nexus-one-665603/review.
https://www.gsmarena.com/htc_google_nexus_one-3069.php.
https://www.gsmarena.com/samsung_i7500_galaxy-2791.php.
https://web.archive.org/web/20110818134659/http:/innovator.samsungmobile.com/bbs/tech/view.do?boardId=4&messageId=17461.
https://www.samsung.com/uk/mobile-phone-buying-guide/samsung-phone-ranges-explained/.
https://www.phonearena.com/news/Samsung-Galaxy-S-series-history-evolution_id78382.
https://images.samsung.com/is/content/samsung/assets/global/ir/docs/2013_business_quarter04.pdf.
https://web.archive.org/web/20130329203723/https://www.droid-life.com/2013/03/27/an-overview-of-android-lock-screen-security-options-beginners-guide/.
https://www.talkandroid.com/reviews/phone/moto-x-review-finally-a-smartphone-with-features-that-matter/.
https://www.gsmarena.com/motorola_moto_x-5601.php.
https://www.youtube.com/watch?v=yRvOlkSELNI.
https://www.anandtech.com/print/7235/moto-x-review.
https://web.archive.org/web/20120721171016/http://benhirashima.com/unlockwithwifi/.
https://web.archive.org/web/20110407065904/https://www.gsmarena.com/samsung_i897_captivate-3408.php.
https://web.archive.org/web/20111104215926/https://www.mobiletechreview.com/phones/Samsung-Captivate.htm.
https://web.archive.org/web/20130210092857/http://www.androidcentral.com/apps-week-eternity-warriors-2-chicken-bandit-espn-fantasy-football-and-more.
https://www.appbrain.com/app/unlock-with-wifi-trial/com.benhirashima.unlockwithwifitrial.
https://web.archive.org/web/20140205093444/http://benhirashima.com/posts/the-rebirth-of-unlock-with-wifi/.
https://www.youtube.com/watch?app=desktop&v=5j8aDmBvej8.
https://web.archive.org/web/20140131082015/http://www.anandtech.com/show/7376/samsung-galaxy-note-3-review.
https://www.appbrain.com/app/skiplock/com.benhirashima.skiplock.
https://web.archive.org/web/20111109101730/http://forum.xda-developers.com:80/showthread.php?t=955092.
https://web.archive.org/web/20140107211847/https://www.talkandroid.com/guides/beginner/how-to-automatically-disable-androids-security-lock-screen-when-connected-to-your-home-wi-fi-bluetooth-device-or-by-location/.
https://www.appbrain.com/app/delayed-lock/de.j4velin.delayedlock2.trial.
https://www.semanticscholar.org/paper/Location-Based-Authentication-and-Authorization-Zhang-Kondoro/b854f83ab609af8ac44c08e92a98a61fd84090ce; http://kth.diva-portal.org/smash/get/diva2:576463/FULLTEXT01.
Web: https://support.apple.com/en-us/HT204380, Apple, iOS7, Face Time, 7 pages.
Notification of transmittal of the international search report and the written opinion (12 pages) dated on 11, 2015.

* cited by examiner

ELECTRONIC APPARATUS AND METHOD OF PROVIDING PRE-UNLOCK TO USER

BACKGROUND OF THE INVENTIVE CONCEPT

1. Field of the Inventive Concept

The present inventive concept relates to an electronic apparatus and method of providing a pre-unlock to a user.

2. Description of the Related Art

When a user needs a function of a mobile device, the user has to unlock the mobile device to access a menu corresponding to the function of the mobile device.

SUMMARY OF THE INVENTIVE CONCEPT

The present inventive concept provides an electronic apparatus to provide a pre-unlock to a user.

The present inventive concept provides a method of providing a pre-unlock to a user.

The present inventive concept provides a computer readable medium to contain computer readable codes as a program to execute a method of providing a pre-unlock to a user.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a mobile device including a network unit to communicate with an external device, a sensor to sense an event of the mobile device, a panel to display a menu and to receive a user input, and a control unit to unlock the mobile device to a normal mode according to an unlock method, to perform a pre-unlock process in response to the first event, which is a lower version of the unlock method, to pre-unlock the mobile device to a pre-unlock mode from a power saving mode, and to perform an unlock process in response to a second event, which is a full version of the unlock method, to unlock the mobile device to the normal mode from the pre-unlock mode.

The sensor may sense a third event of the mobile device, and the control unit may change the mobile device to the pre-unlock mode from the unlock mode in response to the third event.

The sensor may sense a third event of the mobile device, and the control unit may change the mobile device to the power saving mode from the unlock mode in response to the third event.

The sensor may include a camera, the-unlock method may include an image taken by the camera, the first event may include a first resolution of the image as the lower version of the unlock method, and the second event may include a second resolution of the image as the full version of the unlock method.

The second event may include the first event and another event.

The unlock method may include a face recognition, the first event may include a portion of the face recognition as the lower version of the unlock method, and the second event may include a full portion of the face recognition as the full version of the unlock method.

The unlock method may include a face recognition and an additional recognition, the first event may include the face recognition as the lower version of the unlock method, and the second event may include the face recognition and the additional recognition as the full version of the unlock method.

The sensor may sense a motion of the mobile device, the unlock method may include a face recognition in response to the sensed motion, the first event may include the sensed motion as the lower version of the unlock method, and the second event may include the sensed motion and the face recognition as the full version of the unlock method.

The sensor may sense first and second motions of the mobile device, the unlock method may include a face recognition in response to the sensed second motion, the first event may include the sensed first motion as the lower version of the unlock method, and the second event may include the sensed second motion and the face recognition as the full version of the unlock method.

The unlock method may include receiving a signal of the external device, the first event may include a lower signal reception of the external device as the lower version of the unlock method, and the second event may include a higher signal reception of the external device as the full version of the unlock method.

The unlock mode may include a privacy menu and a non-privacy menu, and the pre-unlock mode may include the non-privacy menu.

The pre-unlock mode may include a music.

The pre-unlock mode may include a video.

The pre-unlock mode may include a public posting of a media.

The pre-unlock mode may include news of a news media.

The pre-unlock mode may include operable menus and inoperable menus, and the operable menus may be different from the inoperable menus in tones, colors or shapes.

The control unit may control the panel to display a symbol corresponding to the pre-unlock mode.

The control unit may control the panel to display a first symbol corresponding to the pre-unlock mode and a second symbol corresponding to the unlock mode.

The control unit may automatically perform the unlock method during the pre-unlock mode.

The control unit may perform the unlock method within a time period from the pre-unlock mode to unlock the mobile device to the normal mode from the pre-unlock mode.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
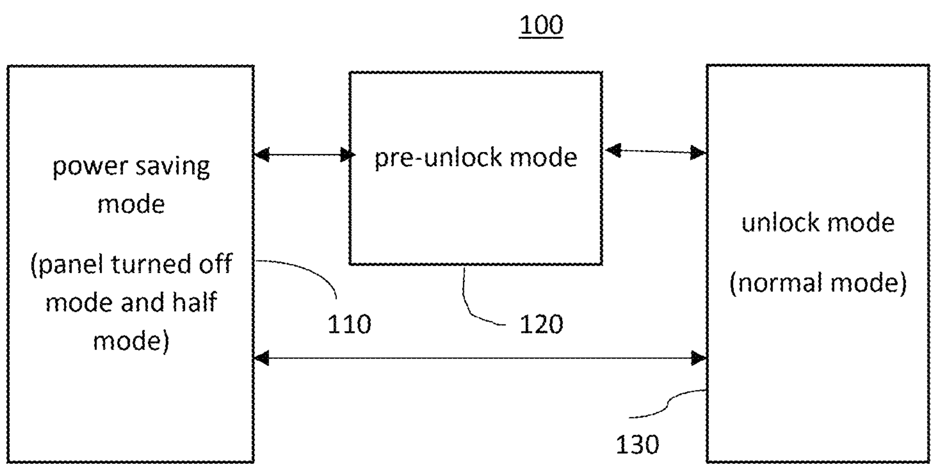
FIG. 1 is a view illustrating a mobile device having a power saving mode, a pre-unlock mode, and an unlock mode according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 is a view illustrating a mobile device 100 having a power saving mode 110, a pre-unlock mode 120, and an unlock mode 130 according to an embodiment of the present inventive concept.

The mobile device may perform the power saving mode 100, the pre-unlock mode 120, and the unlock mode (or normal mode) 130 according to corresponding events of the mobile device 100.

The power saving mode 110 may correspond to a power off mode, an inactivating mode, a sleep mode, etc. The unlock mode 130 may be a normal mode, a power on mode, an activating mode, etc. The mobile device 100 may be unlocked from the power saving mode 110 to the unlock mode 130 according to at least one of unlocking methods which include biometric authentication methods including a face recognition method, password method, and trusted location method, and trusted device method, for example. The power saving mode 110 may include a screen turned off mode, in which a screen of a panel is turned off, and a half mode in which the screen is not turned off but displays at least one menu for example, a camera icon for a camera to be partially operable without unlocking the mobile device 100 to the unlock mode 130. The camera may be fully operable in the unlock mode 130. The mobile device 100 may be unlocked to the unlock mode 130 from one of the screen turned off mode and the half mode of the power saving mode 110 according to the at least one of the unlock methods. The mobile device 100 is changed to the screen turned off mode from the half mode in the power saving mode 110 when the mobile device 100 is unlocked to the unlock mode 130 by using the unlock methods within a period of 5 seconds, 10 seconds, 30 seconds, etc. The power saving mode 110, unlock mode 130, and unlocking methods are well known, and thus detailed descriptions are omitted here.

The mobile device 100 may have a plurality of icon menus including private icon menus and public icon menus. The private icon menus may be related to a user privacy, and the public icon menus may be not related to the user privacy. The user privacy may be defined according to a user preference or a maker preference. For example, the mobile device 100 may allow a user to select which menu or function is related to the user privacy. For example, bank menu icons may be related to the user privacy. It is possible that phone records may be related to the user privacy. It is also possible that any menu using the biometric method to perform the menu function may be related to the user privacy. It is also possible that a user may define any content to be related to the user privacy, and in this case, any menu function including the user privacy content may be related to the user privacy.

The unlock mode 130 may correspond to a normal mode and may include all of the icon menus of the mobile device 100 which include one or more private icon menus and one or more non-privacy icon menus. The pre-unlocked mode 120 may include non-privacy icon menus which are not related to a user privacy. A user of the mobile device 100 may use the one or more non-privacy related menus in the pre-unlocked mode 120. The mobile device 100 may display the non-privacy related menus on a screen of a panel in the pre-unlock mode 120. It is possible that the mobile device 100 may display all of the privacy related menus and the non-privacy related menus in the pre-unlock mode 120. The privacy related menus may not be selectable or operable, or may be dimmed compared to the non-user privacy related menus when being displayed on the screen of the panel in the pre-unlock mode 120. It is possible that the privacy related menus may not be displayed on the screen of the panel in the pre-unlock mode 120.

The mobile device 100 may be pre-unlocked to the pre-unlock mode 120 from the power saving mode 100 or the unlock mode 130 according to a pre-unlock method. The pre-unlock method for the pre-unlock mode 120 may be different from the unlock method for the unlock mode 130. The pre-unlock method may include sensing an event for the pre-unlock mode 120 to pre-unlock the mobile device 100 to the pre-unlock mode 120. The event may include a detection of a motion of the mobile device 100, a detection of an image, a detection of a sound, a detection of an external signal, a detection of any emergency condition of the mobile device 100 such as a car accident, shocking, or damage, and/or a detection of any environmental condition of the mobile device 100 such as light and audio characteristics. However, the present inventive concept is not limited thereto. The event may be defined by a user or a maker of the mobile device 100. The pre-unlock method may include pre-unlocking the mobile device 100 according to the event. The pre-unlocking method may include pre-unlocking the mobile device 100 according to the event and a less degree of the unlocking method. For example, the unlocking methods may require a user input face to match about 100% of an authorized user face stored in a memory of the mobile device 100, and the event may include a less match, for example, a certain % match or a 50% match between the user input face and the authorized user face. For example, the unlocking methods may require a detection of an external device, and the pre-unlocking method may include a less % detection of a signal from the external device, such as 35% or 50%, of the external device. The pre-unlocked mobile device 100 may be unlocked to the normal mode 130 from the pre-unlocked mode 120 according to at least one of the unlock methods.

When a user is in a car accident situation, is unable to reach the mobile device 100, or is unable to perform the unlock methods, the mobile device 100 may be pre-unlocked by the event so that the user can use a menu to contact a person of a phone or message list or can access a social media through menus displayed on a screen of a panel of the mobile device 100 during the pre-unlock mode 120. The event may be not limited to the above-described events. It is possible that any event to perform the pre-unlock method may be defined by a mobile device user preference or a mobile device maker preference.

When a user urgently needs to record a sound and/or image, a mobile device may be pre-unlocked to allow the user to record the sound and/or image in the pre-lock mode. It is possible that the mobile device may be pre-unlocked to automatically record the sound and/or image when a menu of the mobile device is set to perform the recording according to the event.

When a user is unable to reach the mobile device 100, the user may speak toward the mobile device 100. The mobile device 100 may be pre-unlocked to the pre-unlock mode 120 according to a user voice as the event. The mobile device 100 may activate a unit or component to sense the event in the power saving mode 110 or the unlock mode 130 to perform the pre-unlock method according to the event. When a user is in a vehicle which is damaged, the mobile device 100 may receive a signal from the vehicle as the event to pre-unlock the mobile device 100 to the pre-unlock mode 120.

When the unlock method is set to use a face recognition and when a user is in a position unable to be in front of a camera of a functional unit of the mobile device 100 to perform the unlock method of the face recognition to unlock the mobile device 100 to the unlock mode 130, the mobile device 100 may be pre-unlocked according to the event such that the user may access a menu of the pre-unlock mode 120 according to the event and then may also access another menu of the unlock mode 130 according to the unlock method if necessary.

When the unlock method is set to use a fingerprint and when a user is unable to touch a sensor of a functional unit of the mobile device 100 to perform the unlock method of the fingerprint to unlock the mobile device 100 to the unlock mode 130, the mobile device 100 may be pre-unlocked according to the event such that the user may access a menu of the pre-unlock mode 120 according to the event and then may also access another menu of the unlock mode 130 according to the unlock method.

When a user wants to listen a music or video and when the user is unable to perform the unlock method, the mobile device 100 may be pre-unlocked according to the event to play the music or video in the pre-unlock mode 120. When a user wants to access a public posting of a media, the mobile device 100 may allow the user to access the public posting in the pre-unlock mode. When a user wants to publish a posting through a media, the mobile device 100 may allow the user to publish the posting in the pre-unlock mode. However, the present inventive concept is not limited thereto. A user may be allowed to set one or menus to perform in the pre-unlock mode 120.

When a time condition is set to unlock a mobile device according to a password method or a non-password method, that is, a mobile device is unlocked according to the password when the mobile device is not in the time condition, such 4 hours, or according to the non-password method when the mobile device is in the time condition, such as 4 hours. However, the time condition may be not applied to the pre-unlock method. The mobile device may be pre-unlocked regardless the time condition.

The mobile device 100 may be changed from the power saving mode 110 to the pre-unlock mode 120, may be changed from the power saving mode 110 to the unlock mode (or normal mode) 130, may be changed from the pre-unlock mode 120 to the unlock mode (or normal mode) 130, may be changed from the unlock mode (or normal mode) 130 to the pre-unlock mode 120, and may be changed from the unlock mode (or normal mode) 130 to the power saving mode 110.

A first time condition may be applied when the mobile device 100 is changed from the power saving mode 110 to the unlock mode (or normal mode) 130 according to the unlock method. The first time condition may not be applied when the mobile device 100 is changed from the power saving mode 110 to the pre-unlock mode 120. However, a user may set a second time condition to be applied when the mobile device 100 is changed from the power saving mode 110 to the pre-unlock mode 120. The present inventive concept is not limited thereto. A user or a maker of the mobile device 100 may set a preference of when the first or second time condition is applied.

When the mobile device 100 is changed from a power turned off mode to a power turned on mode, the mobile device 100 may require a password method to be unlocked to the unlock mode (or normal mode) 130. However, it is possible that when the mobile device 100 is changed from a power turned off mode to a power turned on mode, the mobile device 100 may be changed to the pre-unlock mode 120 according to the event. In this case, the mobile device may be changed from the pre-unlock mode 120 to the unlock mode 130 according to the password method. However, it is possible that the mobile device 100 may be changed from the pre-unlock mode 120 to the unlock mode (or normal mode) 130 according to the non-password method or the unlock methods.

The pre-unlock mode 120 may be maintained for a period which may be set by a user or a maker of the mobile device 100. The period may be extended according to repetition of the event for the pre-unlock method. When the period is set to one minute and the event is a user voice, the period is extended according to the user voice during the per-unlock mode 120. When the period is set to two minutes and the event is a motion of the mobile device 100, the period is extended according to the motion during the per-unlock mode 120. However, the period may not be extended to a second period which may be set by a user or a maker of the mobile device 100. The pre-unlock mode 120 may perform a voice command method to operate a menu of the pre-unlock mode 120 according to a user voice instead of touching the menu.

The mobile device 100 may manually or automatically perform the unlock method during the pre-unlock mode 120 to unlock to the unlock mode 130 from the pre-unlock mode 120.

When the mobile device 100 is unlocked to a normal mode or unlock mode 130 according to the unlock method, the unlock method determines whether a user input or an event matches an authorized user of the mobile device 100. The mobile device is unlocked to the normal mode 130 when the user input or event matches the authorized user in the unlock method. However, it is possible that the user input or event may not be almost 100% match with the authorized user. In this case, the mobile device 100 may provide a pre-unlock mode 120 to a user in response to the user input or event which is a lower version of the unlock method. Thereafter, the mobile device 100 may provide the unlock mode 130 to the user according to a full version of the unlock method in the pre-unlock mode 120.

When the unlock method includes a face recognition and an additional recognition such as eye opening or glasses, the unlock method for the normal mode 130 may be the face recognition and the additional recognition. It is possible that the mobile device 100 may provide the pre-unlock mode 120 to the user in response to the face recognition without the additional recognition, and then may attempt to sense the face recognition and the additional recognition or the additional recognition to change the pre-unlock mode to the normal mode or unlock mode.

When the unlock method includes a face recognition to match an authorized user of the mobile device 100, the mobile device 100 may be unlocked to the unlock mode 130 according to the face recognition. However, when the mobile device 100 is not able to change to the unlock mode due to a missing portion of the face recognition. When the mobile device 100 does not receive a full portion of the face recognition, the mobile device 100 may change the power saving mode 100 to the pre-unlock mode 120. Subsequently, the mobile device 100 may be changed to the unlock mode 130 from the pre-unlock mode according to the full portion of the face recognition.

The mobile device 100 may require a password to unlock to a normal mode when the pre-unlock method and the unlock method fail in the power saving mode 110. The mobile device 100 may require the password to unlock to a normal mode when the unlock method fails in the pre-unlock mode 120.

Figure 2:
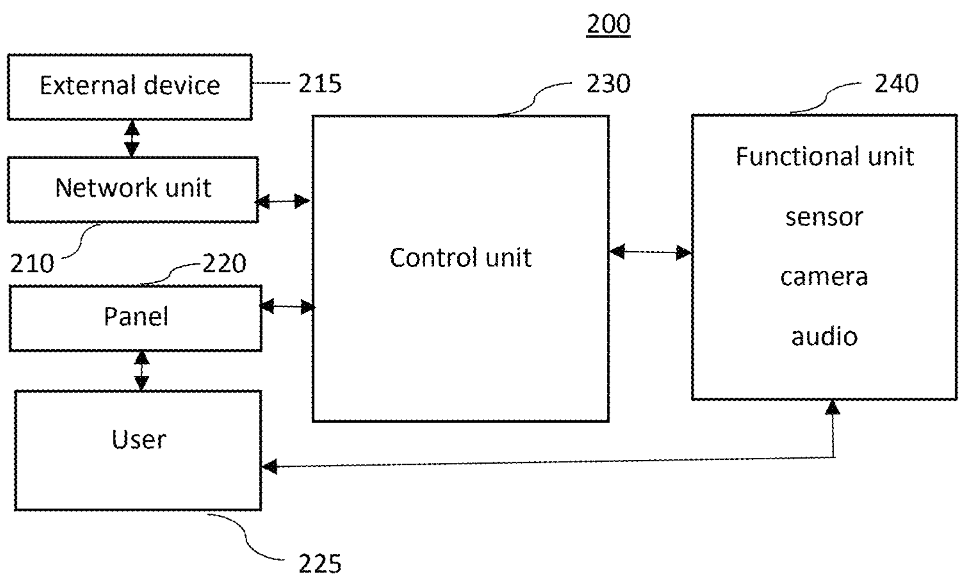
FIG. 2 is a block diagram illustrating a mobile device according to an embodiment of the present inventive concept.

FIG. 2 is a block diagram illustrating a mobile device 200 according to an embodiment of the present inventive concept. The mobile device 200 may be an electronic terminal apparatus, a desktop computer, a computer apparatus, a laptop computer, a portable personal computer, a mobile electronic device, a mobile phone, a smartphone, a mobile tablet apparatus, a mobile tablet computing apparatus, an audio or video recording and/or reproducing apparatus, a photographing apparatus, a communication device, etc.

The mobile device 200 may include a network unit 210 to detect or communicate with an external device 215, a panel 220 to display a menu or an image on a screen and to receive a user input from a user 225, a control unit 210, and a functional unit including one or more sensors (or detectors), one or more cameras, and audio input/output unit such as microphone/speaker. The control unit controls all units of the mobile device 200.

The control unit 230 may include a data storage unit, a semiconductor memory unit, a central processing unit, a user interface unit, a graphic user interface unit, and a computer-readable medium containing computer-readable codes as a program to execute a method of the computing device 200. The control unit 210 may be connected to an external data storage unit through a port of the mobile device 200. A housing of the mobile device 200 may include the port such that another external data storage can be detachably attached to the port of the housing, and the port may be connected to the control unit 210 to transmit and receive data. It is possible that the mobile device 200 may be wirelessly connected to the external storage device.

The panel 200 may include a display panel to display the menu or image and a touch panel to receive the user input from the user 225. A password or fingerprint may be input through the panel as the unlock method to unlock the mobile device 200 to a normal mode or the unlock mode 130 of FIG. 1. The camera may be operable as one of the sensors to photograph an object image or a user image to sense an event for a pre-unlock mode. The sensors (or detectors) may include a first sensor to sense the motion of the mobile device 200, a second sensor to sense an image, a third sensor to sense the emergency condition, a third sensor to sense the environmental condition, a fourth sensor to sense a signal from an external device, and a fifth sensor to receive any event defined by a user of the mobile device 200.

The control unit 230 may perform the pre-unlock method of receiving the sensing results as the event and pre-unlocking the mobile device 200. The control unit 230 may perform the pre-unlock method including both the event and a less degree of the unlock methods to pre-unlock the mobile device 200 to the pre-unlock mode 120 of FIG. 1.

The mobile device 200 may use the functional unit 240 and/or the network unit 210 to perform the unlock methods of biometric authentication, fingerprint, trusted location, trusted device and so on. The mobile device 200 may use the functional unit 240 and/or the network unit 210 to perform the pre-unlock method. The pre-unlock method may use a less degree of the unlock methods. The pre-unlock method may use a less accuracy of the unlock method. The pre-unlock method may use an uncertainty of the unlock method. The pre-unlock method may use a less signal reception of a certain %, for example, 50% or 70% than a normal signal reception of the unlock method.

The pre-unlock method may be different from the unlock method. For example, when a face recognition is set as an unlock method of the mobile device 200, the pre-unlock method may use a less accuracy of the face recognition as the event compared to the accuracy of the face recognition of the unlock method. It is possible that the pre-unlock method may use a portion of a user face as the event to perform the pre-unlock method. Since a camera of the mobile device 200 has a limited photographing angle to perform the unlock method, the mobile device 200 may use a portion of the user face to perform the pre-unlock method. It is possible that the pre-unlock method may use a blurred condition or a low resolution condition of a user face image as the event to perform the pre-unlock method since a camera of the mobile device 200 has a limited photographing distance to perform the unlock method.

When a face recognition is set as an unlock method of the mobile device 200, a detection of a signal of an external device may be set as the event of the pre-unlock method. When a face recognition is set as an unlock method of the mobile device 200, a detection of a motion of the mobile device 200 may be set as the event of the pre-unlock method. Regardless of the unlock method, the pre-unlock method may be set with detection of a motion of the mobile device 200 as the event. A predetermined motion of the mobile device 200 may be set as the event to perform the pre-unlock method. The predetermined motion may be different from a motion of the mobile device 200 to put the mobile device in front of a user to perform the unlock method.

It is possible that the mobile device 200 may attempt to perform the unlock method and recognize an event from the unlock method and may perform the pre-unlock method according to the event to pre-unlock the mobile device to the pre-unlock mode. Thereafter, the mobile device may attempt to perform the unlock method during the pre-unlock mode to unlock the mobile device to the unlock mode.

Figure 3:
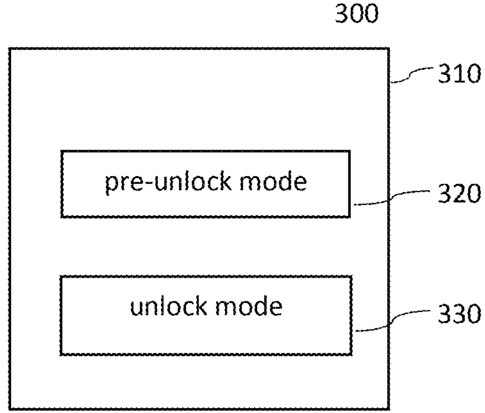
FIG. 3 is a view illustrating a mobile device to select a pre-unlock mode and am unlock mode according to an embodiment of the present inventive concept.

FIG. 3 is a view illustrating a mobile device 300 to set a pre-unlock mode menu 320 and an unlock mode menu 330 displayed on a screen of a panel 310 according to an embodiment of the present inventive concept.

When a user selects the pre-unlock mode menu 320, the mobile device 300 may be set to perform the pre-unlock method to pre-unlock the mobile device 300 to a pre-unlock mode according to an event.

It is possible that when the user selects the pre-unlock mode menu 320, the panel 310 may display options of the pre-unlock mode menu 320, that is, setting an event or setting a less accuracy of the unlock method.

It is possible that the option may be a time condition to be applied to the pre-unlock method. That is, a time condition, for example, one minute, is applied to perform the pre-unlock method. It is possible that a time condition, for example, five minutes, is applied to change the pre-unlock mode to the unlock mode (normal mode). If the mobile device fails to perform the unlock method to change from the pre-unlock mode to the unlock mode (normal mode) within a time period from the pre-unlock mode, the mobile device may be changed to the power saving mode from the pre-unlock mode.

When a user selects the unlock mode menu 330, the mobile device 300 may be set to perform the unlock method to unlock the mobile device 300 to a normal mode according to a password method or a non-password method. It is possible that when the user selects the unlock mode menu 330, the panel 300 may display options of the unlock mode menu 330, that is, setting the password method and the non-password method. When the user selects the option of the password method, the user may set a password to be stored in a memory of the mobile device 300. When the user selects the option of the non-password method, the user may set an authentication user or authorized user (user face, user fingerprint, trusted place, trusted device, etc.) to be stored in the mobile device 300. It is possible that an option of the non-password method may be set together with a time condition. When the mobile device is in the time condition, the option of the non-password method may be applied to perform the unlock method to unlock the mobile device 300 to a normal mode.

It is possible that the face unlock method may be set with a third time condition, the fingerprint unlock method may be set with a fourth time condition, the trusted place unlock method may be set with a fifth time condition, and the trusted device unlock method may be set with a sixth time condition.

When a user selects the pre-unlock mode menu 320, the mobile device 300 may provide various options for a user to set a pre-unlock method as described above. When the user selects the unlock mode menu 330, the mobile device 300 may provide various options for a user to set an unlock method as described above. It is possible that when a user selects the pre-unlock mode menu 320, the mobile device 300 may provide a preset pre-unlock method to be performed. When the user selects the unlock mode menu 330, the mobile device 300 may provide a preset unlock method to be performed.

Figure 4:
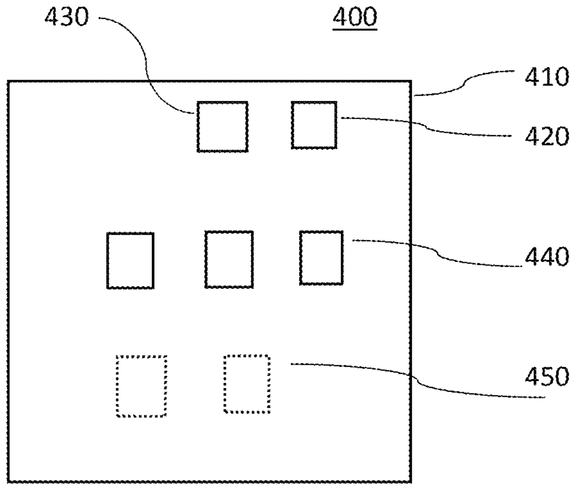
FIG. 4 is a view illustrating a mobile device having various menu images according to an embodiment of the present inventive concept.

FIG. 4 is a view illustrating a mobile device 400 having various menu images according to an embodiment of the present inventive concept.

The mobile device 400 may include a panel 410 with a screen, a first symbol 430 representing a pre-unlock mode as a mode of the mobile device 400 and/or a second symbol representing an unlock mode as another mode of the mobile device 400, one or more non-privacy menus 440 corresponding to the pre-unlock mode, and one or more privacy menus 450 corresponding to the unlock mode.

The mobile device 400 may display the one or more non-privacy menus 440 on a first area of the screen of the panel 410 as a first group and the one or more privacy menus 450 on a second area of the screen of the panel 410, in the pre-unlock mode. It is possible that the one or more non-privacy menus 440 may be highlighted or toned compared to the one or more privacy menus, and/or the one or more privacy menus 450 may be dimmed compared to the one or more privacy menus. It is possible that the one or more non-privacy menus 440 may be defined by a solid line, and/or the one or more privacy menus 450 may be defined by a dotted line.

In the unlock mode, the mobile device 400 may display all of the one or more privacy menus 450 and the one or more non-privacy menus 440 on the screen of the panel 410. The arrangement of the one or more privacy menus 450 and the one or more non-privacy menus 440 on the screen of the panel 410 in the unlock mode may be different from the arrangement of the one or more privacy menus 450 and the one or more non-privacy menus 440 on the screen of the panel 410 in the pre-unlock mode. It is possible that arrangements of menus in the pre-unlock mode and the unlock mode are same. It is possible that menus of the pre-unlock mode and menus of the unlock mode may be differently toned.

Figure 5:
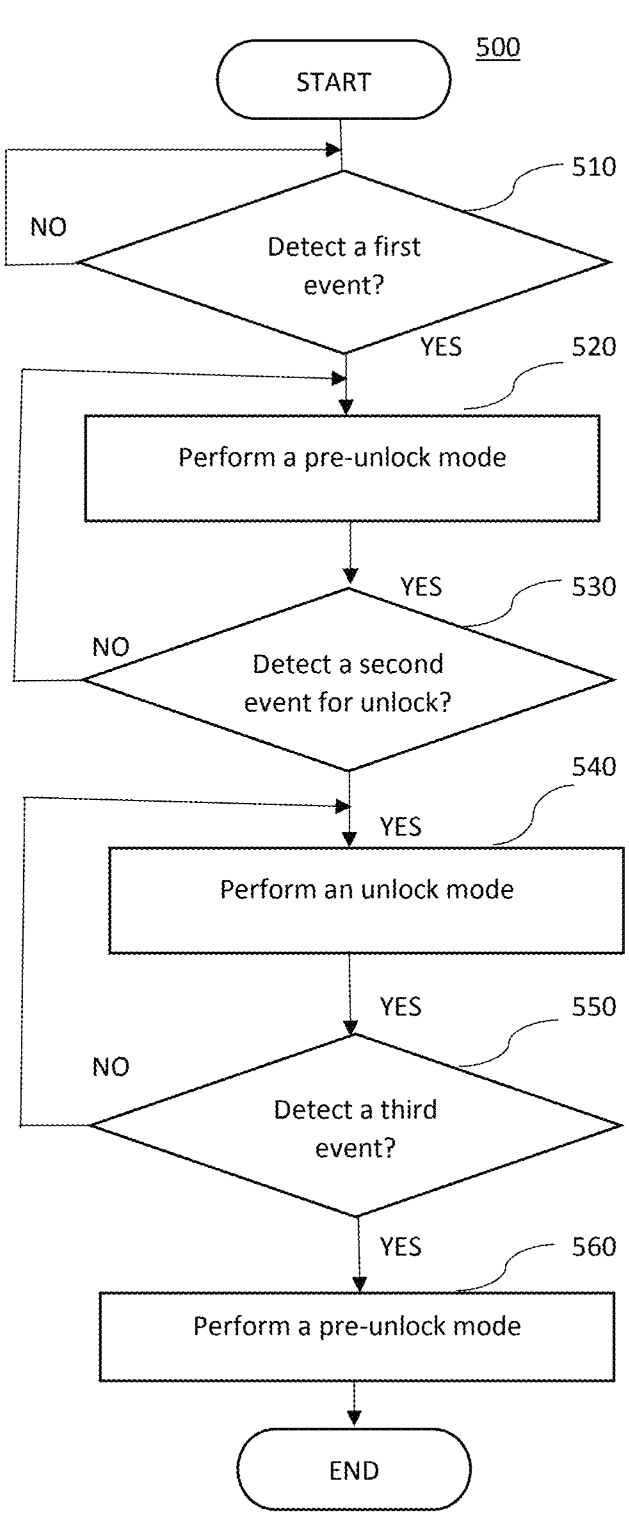
FIG. 5 is a flowchart illustrating a method of a mobile device to perform a pre-unlock mode according to an embodiment of the present inventive concept.

FIG. 5 is a flowchart illustrating a method 500 of a mobile device to perform a pre-unlock mode according to an embodiment of the present inventive concept.

At operation 510, the mobile device determines whether an event is detected to perform a pre-unlock method. When it is determined that the event has been detected at operation 510, the mobile device may perform the pre-unlock mode according to the event at operation 520. At operation 530, the mobile device determines whether a second event is detected to perform an unlock method during the pre-unlock mode. The second event may be an unlock method to unlock the mobile device to a normal mode or unlock mode from the power saving mode or the pre-unlock mode. When it is determined that the second event is detected at operation 530, the mobile device may perform the unlock mode according to the unlock method at operation 540. At operation 550, the mobile device determines whether a third event is detected during the unlock mode, the pre-unlock mode is performed according to the third event at operation 560.

It is possible that when it is determined that the second event is not detected at operation 530, the mobile device may perform the pre-unlock mode of operation 520 or operation 560. It is also possible that when it is determined that the third event is not detected at operation 550, the mobile device may perform the unlock mode of operation 540. It is possible that the third event may be same as the first event or may be detected when a period has passed from a time of a last operation of the unlock mode of operation 540. It is possible that the unlock mode of operation 540 may be changed to the pre-unlock mode of operation 520 or operation 560. It is possible that when the third event is detected at operation 550, the mobile device may be locked to the power saving mode from the unlock mode of operation 540. It is possible that the mobile device may require a password to unlock to a normal mode when the second event is not detected during the pre-unlock mode at operation 530.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A mobile device comprising:

a network unit to communicate with an external device;

a sensor to sense a first event during a power saving mode, and to sense a second event during a pre-unlock mode, wherein the first event is a lower version of an unlock method, and the second event is a full version of the unlock method;

a panel to display a menu and to receive a user input; and a control unit to unlock the mobile device from the power saving mode to a normal mode according to a password input through the panel, to perform a pre-unlock process in response to the first event to pre-unlock the mobile device from the power saving mode to the pre-unlock mode, and to perform an unlock process in response to the second event to unlock the mobile device from the pre-unlock mode to the normal mode.

2. The mobile device of claim 1, wherein the sensor senses a third event of the mobile device, and the control unit changes the mobile device to the pre-unlock mode from the unlock mode in response to the third event.

3. The mobile device of claim 1, wherein the first event and the second event comprise a non-password.

4. The mobile device of claim 1, wherein the sensor comprises a camera, the-unlock method comprises an image taken by the camera, the first event comprises a first resolution of the image as the lower version of the unlock method, and the second event comprises a second resolution of the image as the full version of the unlock method.

5. The mobile device of claim 1, wherein the second event comprises the first event and another event.

6. The mobile device of claim 1, wherein the unlock method comprises a face recognition, the first event comprises a portion of the face recognition as the lower version of the unlock method, and the second event comprise a full portion of the face recognition as the full version of the unlock method.

7. The mobile device of claim 1, wherein the unlock method comprises a face recognition and an additional recognition, the first event comprises the face recognition as the lower version of the unlock method, and the second event comprise the face recognition and the additional recognition as the full version of the unlock method.

8. The mobile device of claim 1, wherein the sensor senses a motion of the mobile device, the unlock method comprises a face recognition in response to the sensed motion, the first event comprises the sensed motion as the lower version of the unlock method, and the second event comprises the sensed motion and the face recognition as the full version of the unlock method.

9. The mobile device of claim 1, wherein the sensor senses first and second motions of the mobile device, the unlock method comprises a face recognition in response to the sensed second motion, the first event comprises the sensed first motion as the lower version of the unlock method, and the second event comprises the sensed second motion and the face recognition as the full version of the unlock method.

10. The mobile device of claim 1, wherein the unlock method comprises receiving a signal of the external device, the first event comprises a lower signal reception of the external device as the lower version of the unlock method, and the second event comprise a higher signal reception of the external device as the full version of the unlock method.

11. The mobile device of claim 1, wherein the unlock mode comprises a privacy menu and a non-privacy menu, and the pre-unlock mode comprises the non-privacy menu, the privacy menu and the non-privacy menu being different from each other in tones, colors or shapes.

12. The mobile device of claim 1, wherein the sensor senses the second event during the power saving mode, and the control unit unlocks the mobile device from the power saving mode to the normal mode according to the second event sensed during the power saving mode.

13. The mobile device of claim 1, wherein the pre-unlock mode comprises at least one of a voice, a sound, an image, a music, and a video.

14. The mobile device of claim 1, wherein the pre-unlock mode comprises a public posting of a media.

15. The mobile device of claim 1, wherein the pre-unlock mode comprises news of a news media.

16. The mobile device of claim 1, wherein the pre-unlock mode comprises operable menus and inoperable menus, and the operable menus are different from the inoperable menus in tones, colors or shapes.

17. The mobile device of claim 1, wherein the control unit controls the panel to display a symbol corresponding to the pre-unlock mode.

18. The mobile device of claim 1, wherein the control unit controls the panel to display a first symbol corresponding to the pre-unlock mode and a second symbol corresponding to the unlock mode.

19. The mobile device of claim 1, wherein the control unit automatically performs the unlock method during the pre-unlock mode.

20. The mobile device of claim 1, wherein the control unit performs the unlock method within a time period from the pre-unlock mode to unlock the mobile device to the normal mode from the pre-unlock mode.

* * * * *